(12) United States Patent
Famolari

(10) Patent No.: US 7,720,509 B2
(45) Date of Patent: May 18, 2010

(54) HARMONIZED ADAPTIVE ARRAYS

(75) Inventor: David Famolari, Stewartsville, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 252 days.

(21) Appl. No.: 10/711,441

(22) Filed: Sep. 19, 2004

(65) Prior Publication Data

US 2005/0075140 A1    Apr. 7, 2005

Related U.S. Application Data

(60) Provisional application No. 60/507,512, filed on Oct. 2, 2003.

(51) Int. Cl.
| | |
|---|---|
| H04B 7/185 | (2006.01) |
| H04B 7/14 | (2006.01) |
| H04B 1/46 | (2006.01) |
| H04B 1/44 | (2006.01) |
| H04M 1/00 | (2006.01) |
| H04J 3/24 | (2006.01) |
| H04H 20/67 | (2008.01) |
| H04W 4/00 | (2009.01) |
| H01Q 21/00 | (2006.01) |

(52) U.S. Cl. ............... 455/562.1; 455/13.3; 455/19; 455/25; 455/82; 455/83; 370/329; 370/339; 370/349; 342/357.1; 343/893

(58) Field of Classification Search ............ 455/562.1, 455/561, 13.3, 19, 25, 63.4, 82, 83; 370/349, 370/339, 329; 342/357.1; 343/893
See application file for complete search history.

(56) References Cited

U.S. PATENT DOCUMENTS

| | | | | |
|---|---|---|---|---|
| 5,943,621 | A * | 8/1999 | Ho et al. | 455/456.3 |
| 7,015,809 | B1 * | 3/2006 | Sayers et al. | 340/539.1 |
| 7,043,272 | B2 * | 5/2006 | Park et al. | 455/562.1 |
| 7,130,663 | B2 * | 10/2006 | Guo | 455/562.1 |
| 7,136,624 | B2 * | 11/2006 | Ofuji et al. | 455/63.4 |
| 7,158,501 | B2 * | 1/2007 | Kasami et al. | 370/339 |
| 2001/0003443 | A1 * | 6/2001 | Velazquez et al. | 342/367 |
| 2002/0082016 | A1 * | 6/2002 | Obayashi | 455/436 |
| 2002/0095486 | A1 * | 7/2002 | Bahl | 709/223 |
| 2003/0048760 | A1 * | 3/2003 | Park et al. | 370/295 |
| 2004/0104839 | A1 * | 6/2004 | Velazquez et al. | 342/357.1 |
| 2004/0121810 | A1 * | 6/2004 | Goransson et al. | 455/562.1 |
| 2004/0204098 | A1 * | 10/2004 | Owen | 455/561 |
| 2005/0047322 | A1 * | 3/2005 | Sondur | 370/203 |
| 2005/0113120 | A1 * | 5/2005 | Rappaport et al. | 455/500 |
| 2005/0192059 | A1 * | 9/2005 | Proctor et al. | 455/562.1 |

* cited by examiner

*Primary Examiner*—Yuwen Pan
*Assistant Examiner*—Bobbak Safaipour
(74) *Attorney, Agent, or Firm*—Banner & Witcoff, Ltd.

(57) ABSTRACT

A system and method for harmonizing adaptive arrays for wireless communication systems. The system includes a basis beam that receives packet transmissions from stations. The system determines the angle of arrival of the packet transmissions and forms a select beam to cover at least one of the stations.

20 Claims, 12 Drawing Sheets

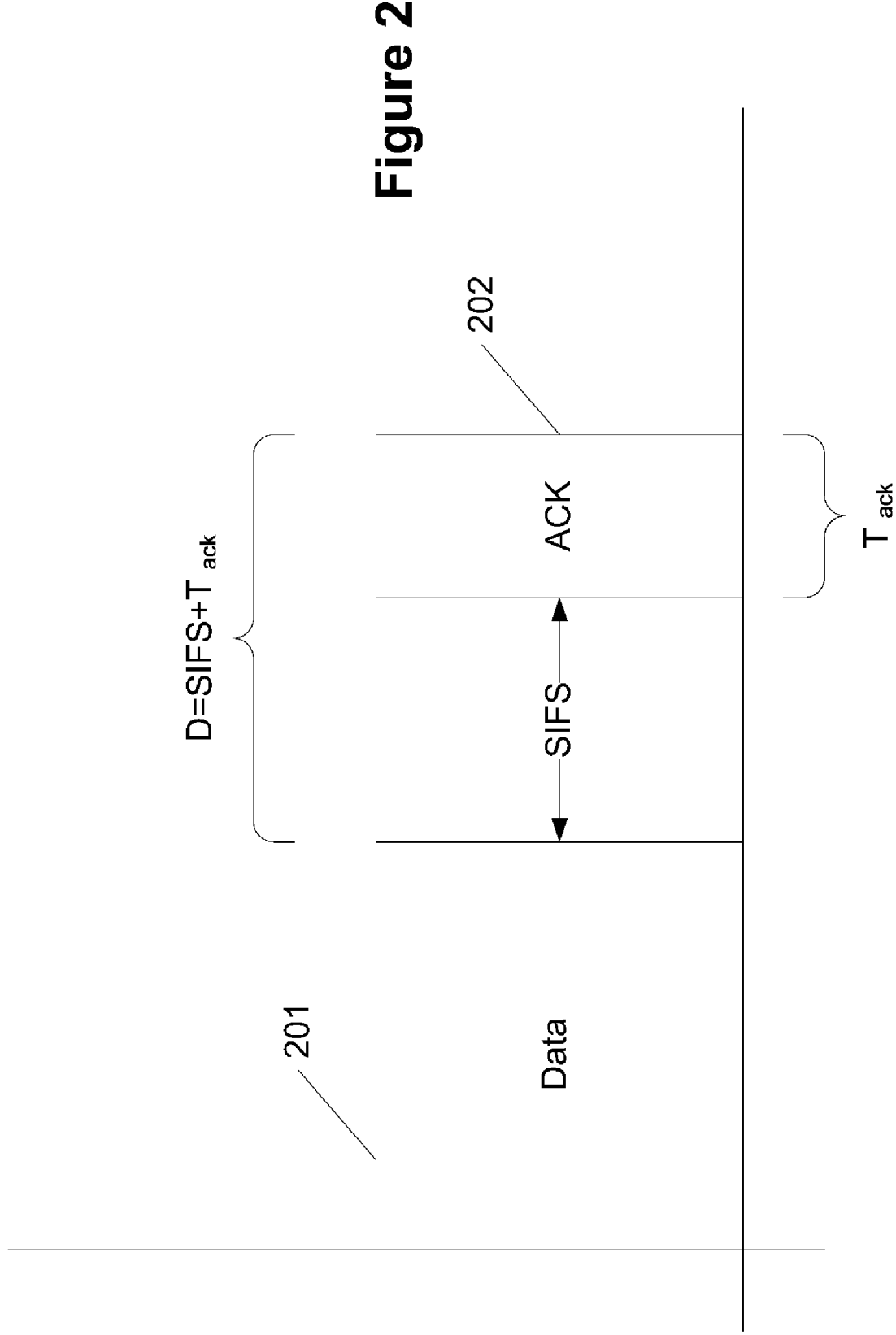

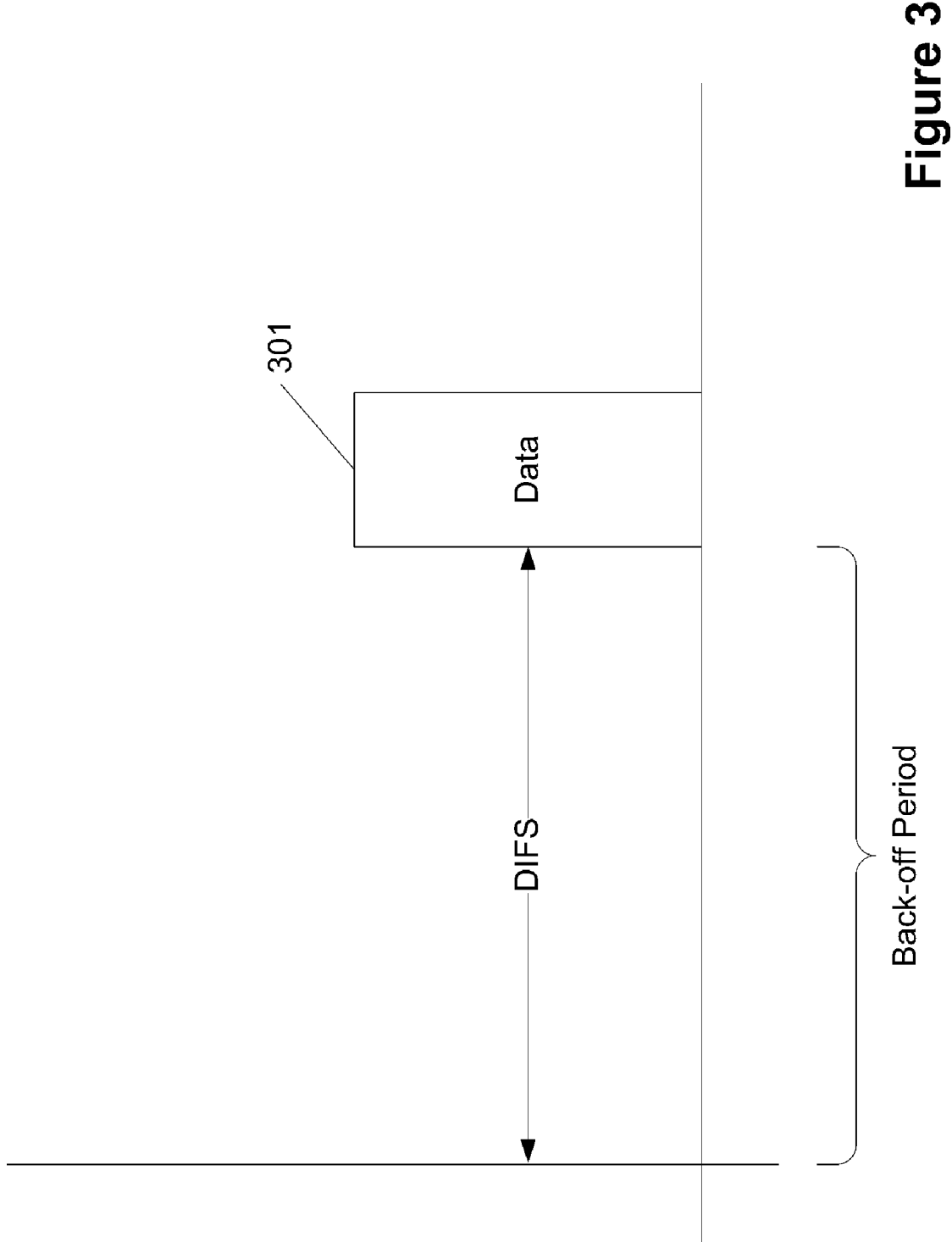

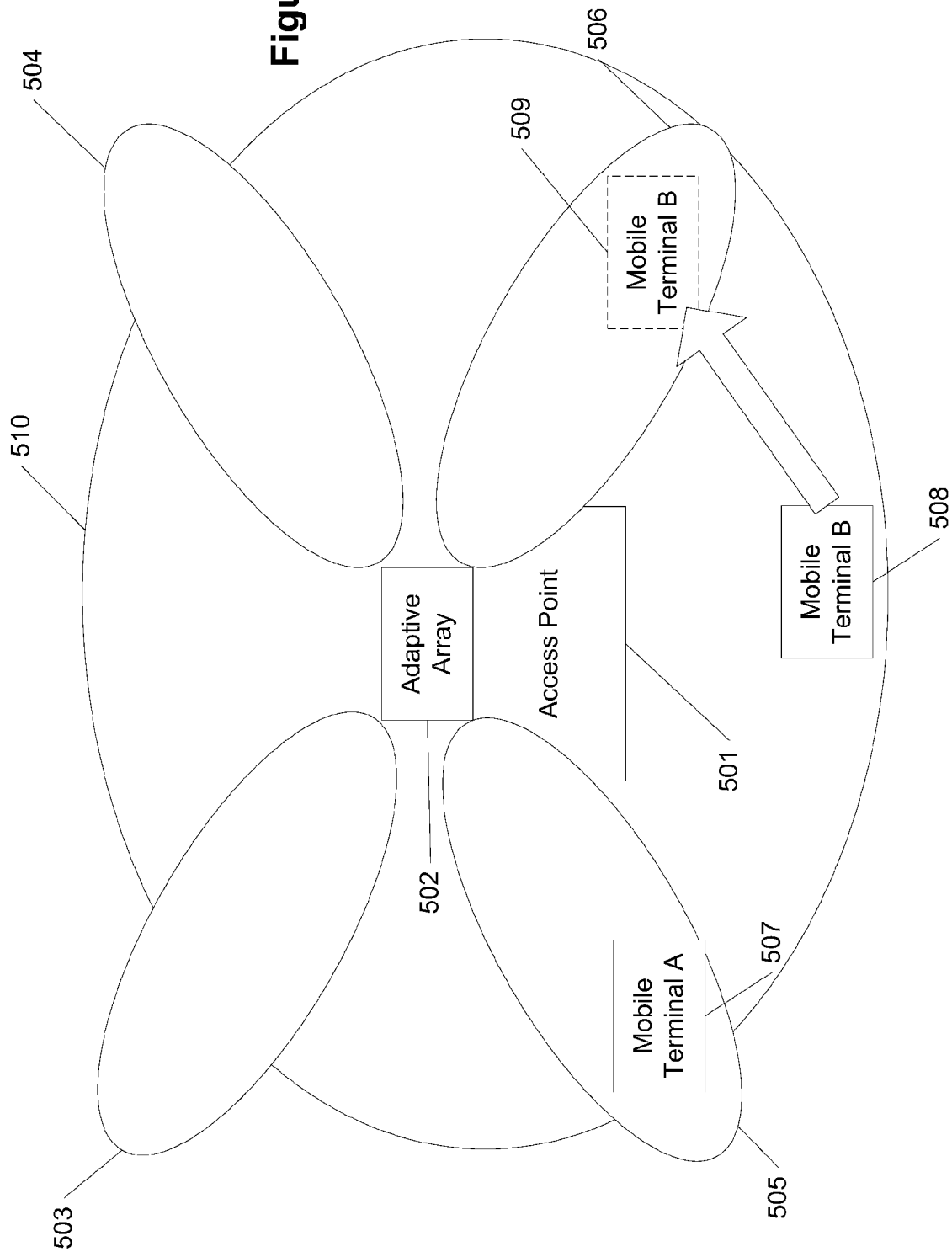

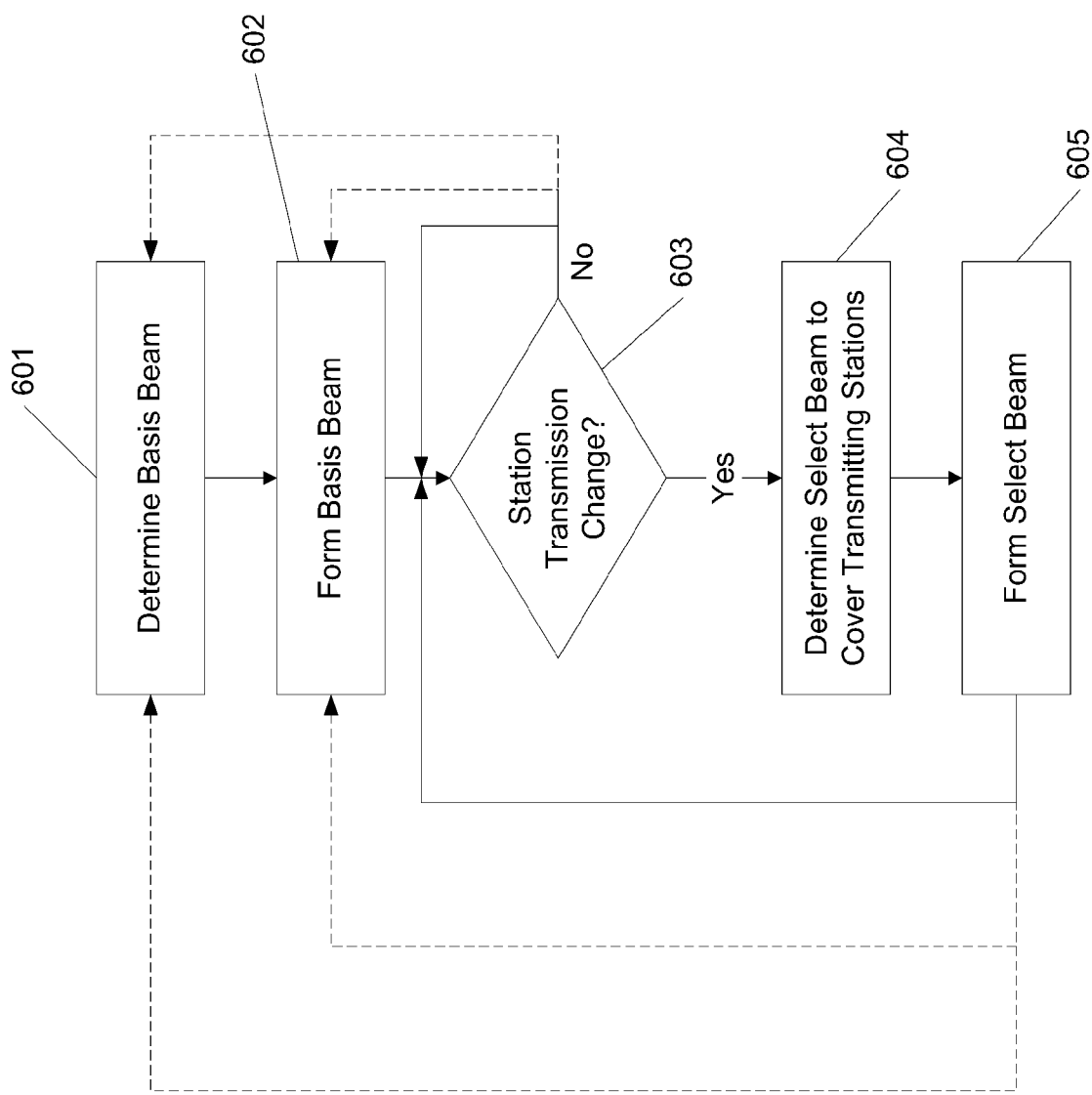

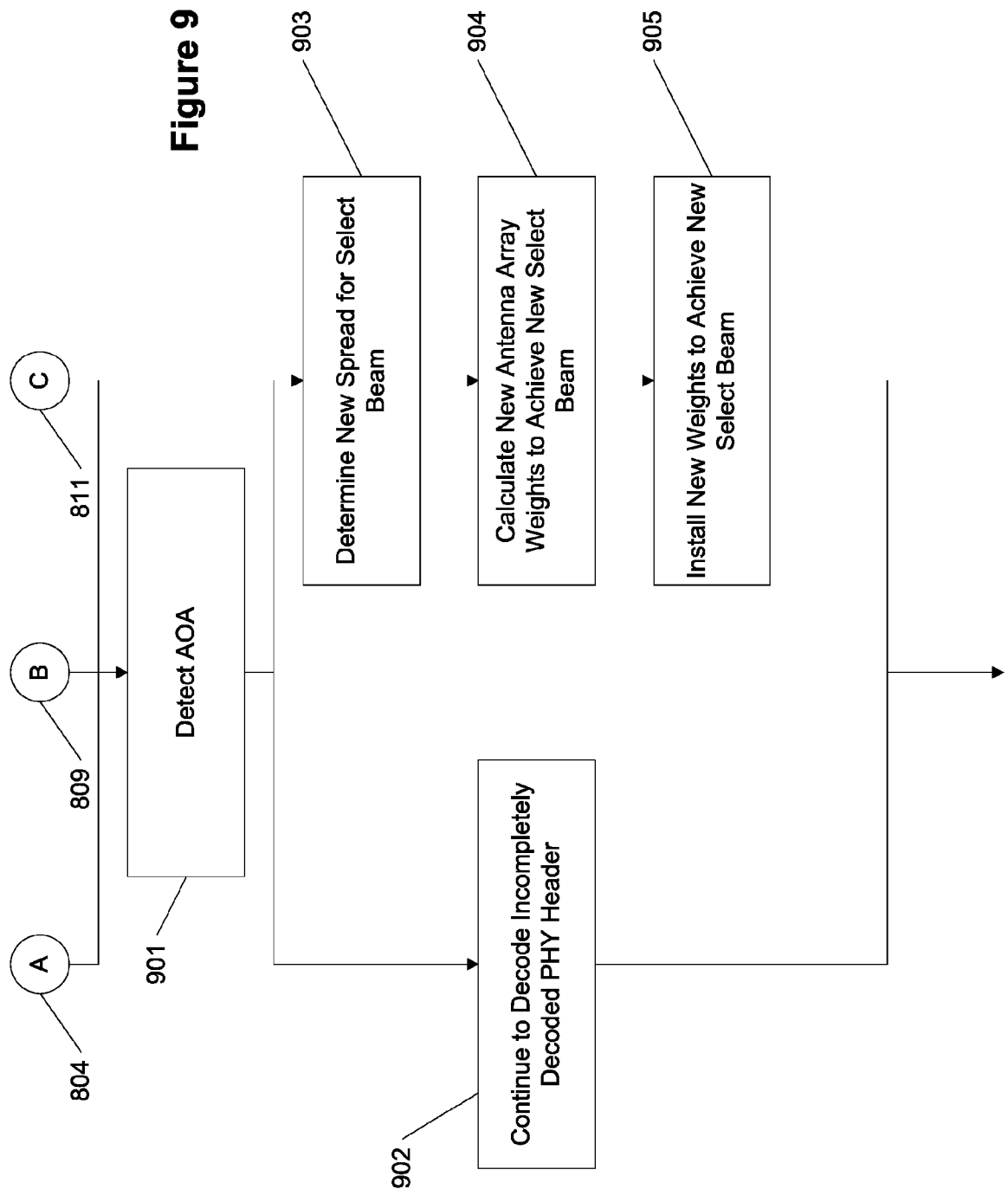

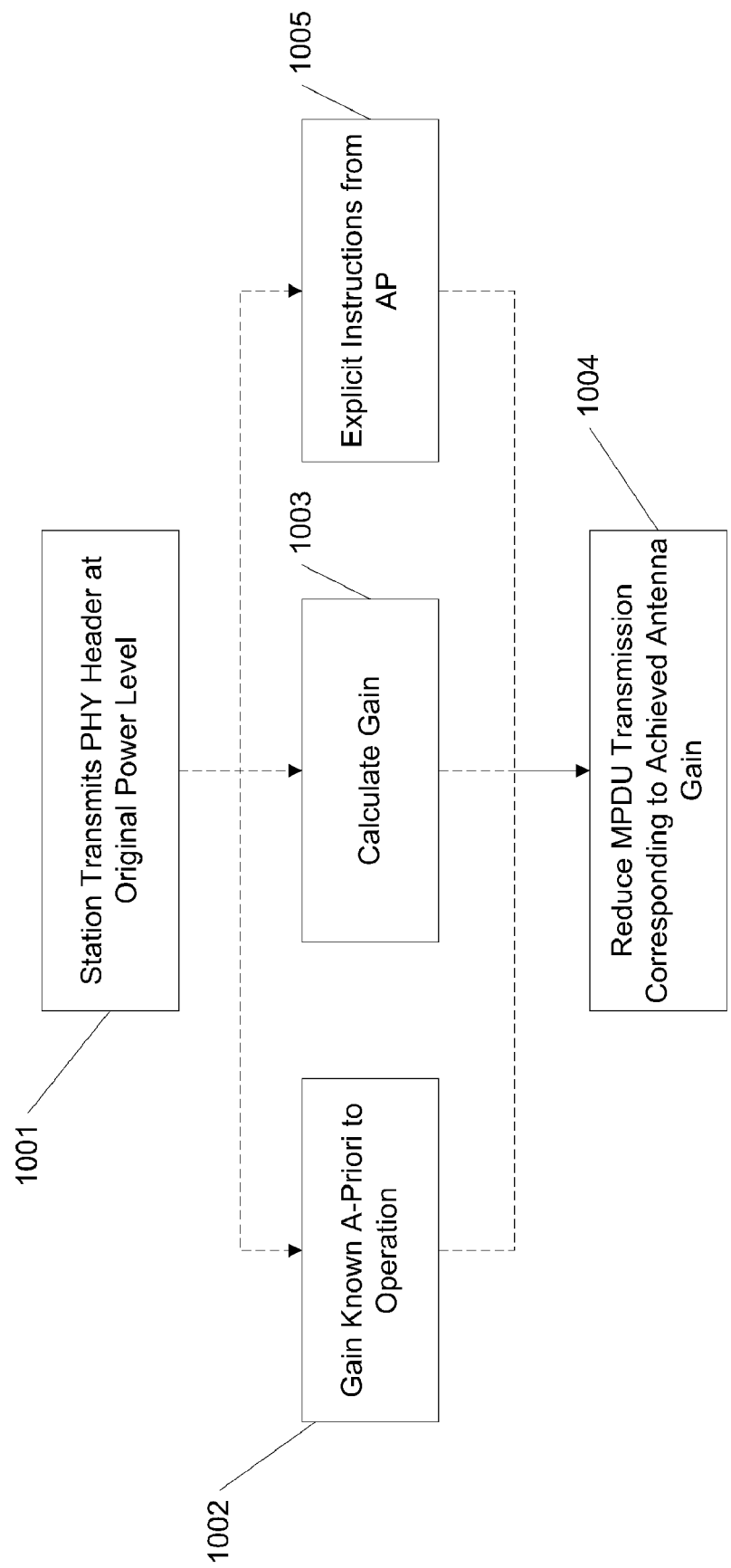

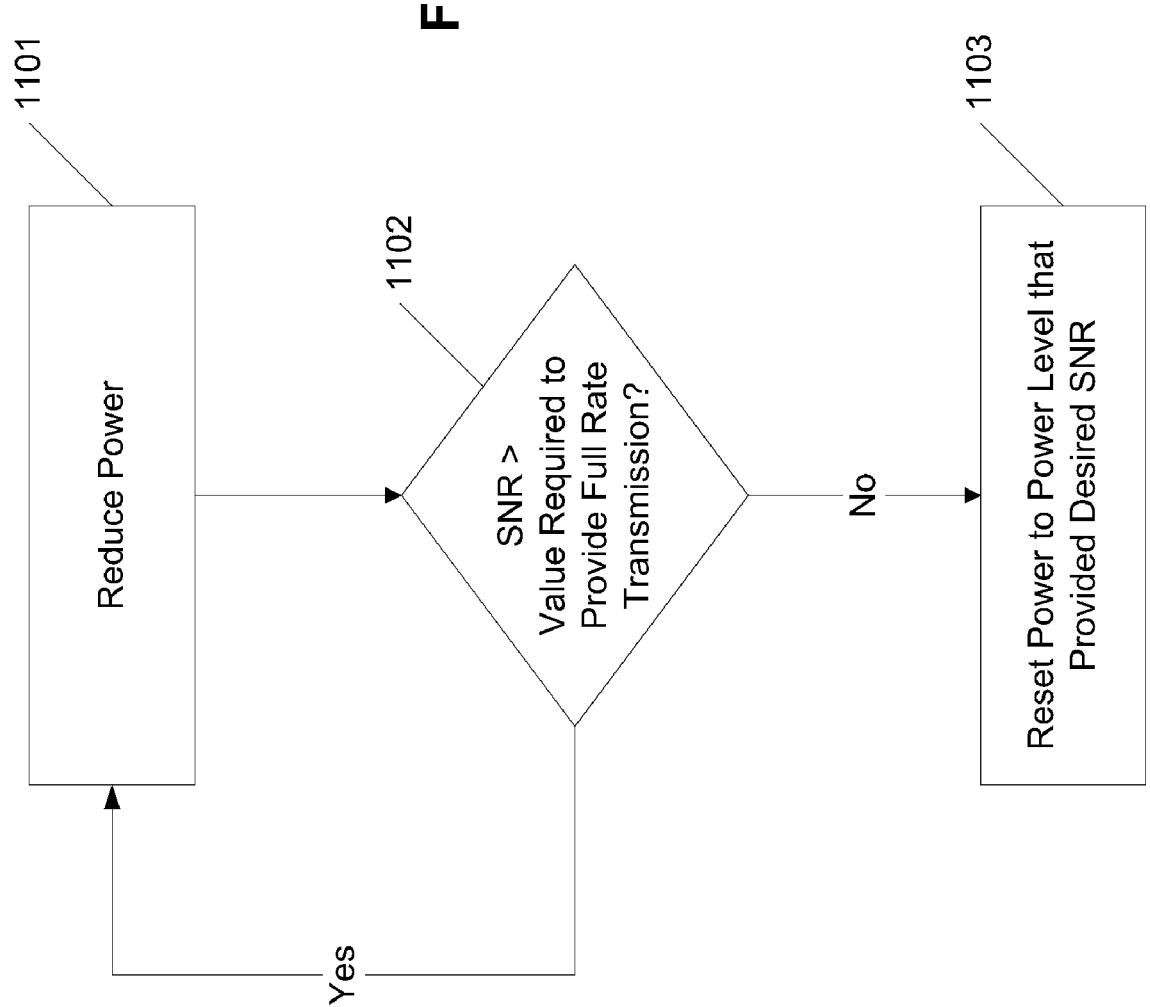

HARMONIZED ADAPTIVE ARRAYS

This application claims priority to U.S. Ser. No. 60/507,512, filed Oct. 2, 2003, whose contents are expressly incorporated herein by reference.

FIELD OF INVENTION

Aspects of the present invention relate to communication systems. More particularly, aspects of the present invention relate to harmonizing access to wireless communication systems.

DESCRIPTION OF RELATED ART

IEEE 802.11 systems, and their derivations, are the most prominent form of Wireless Local Area Network. These systems employ a Medium Access Control (MAC) protocol where stations decide to transmit based on sensing the current idle/active state of the medium to avoid colliding with other transmissions. These types of MAC protocols are part of a family of protocols typically referred to as Carrier Sense Multiple Access with Collision Avoidance (CSMA/CA). The CSMA/CA protocol provides performance gains to WLANs at the MAC layer by allowing distributed access to the shared medium while reducing unwanted packet collisions.

Adaptive antenna array technology provides performance gains to wireless systems at the physical layer by increasing the sensitivity of wireless antennas, known as Antenna Gain (AG). Adaptive Arrays (AA) achieve this gain by forming a narrow antenna pattern, or "beam", that increases antenna sensitivity in the direction of desired signals and decreases antenna sensitivity elsewhere. This allows transmitting stations to enjoy a stronger signal-to-noise ratio (SNR), or alternatively, to achieve the same SNR with less transmission power.

Despite these advantages, adaptive antenna arrays conflict with the requirements of portable devices to be able to access local access points. In particular, a portable device or mobile terminal entering an area covered by an adaptive array may be ignored by the array unless the mobile terminal happens to be covered by one of the narrow beams of the adaptive array.

An improved system is needed that permits new terminals to be recognized and covered by adaptive arrays.

BRIEF SUMMARY

Aspects of the invention address one or more of the issues described above, thereby providing improved access capabilities in wireless communication systems.

BRIEF DESCRIPTION OF DRAWINGS

The present invention is illustrated by way of example and not limited in the accompanying figures in which like reference numerals indicate similar elements.

FIGS. 2-4 show delay periods associated with transmitting data.

FIGS. 5A and 5B show illustrative diagram of beams from an access point in accordance with aspects of the present invention.

FIG. 6 shows illustrative processes for forming beams in accordance with aspects of the present invention.

FIG. 9 shows additional illustrative processes for determining and forming beams in accordance with aspects of the present invention.

FIG. 10 shows illustrative processes for reducing power levels according to antenna gain in accordance with aspects of the present invention.

FIG. 11 shows an illustrative process for reducing power levels in accordance with aspects of the present invention.

DETAILED DESCRIPTION

Aspects of the invention relate to providing improved throughput for wireless communications. While described with reference to IEEE 802.11 standards, aspects of the invention may be used with other protocols as well.

The following description is organized into headings as follows: terms; wireless communications; adaptive arrays and power reduction; IEEE 802.11; DCF operation; packet format; processes for determining selective beam; selective beam; basis beam; basis beam and selective beam coordination; transmission power savings; and transmission rate preservation.

It is noted that various connections are set forth between elements in the following description. It is noted that these connections in general and, unless specified otherwise, may be direct or indirect and that this specification is not intended to be limiting in this respect.

Terms

The following is a table of terms:

| Definition List 1 | |
| --- | --- |
| Term | Definition |
| AP | Access Point |
| PHY | Physical Layer |
| LLC | Logical Link Control |
| MAC | Medium Access Control |
| DCF | Distributed Coordination Function |
| CSMA/CA | Carrier Sensing Multiple Access with Collision Avoidance |
| AA | Adaptive Array |
| AG | Antenna Gain |
| BB | Basis Beam |
| SB | Selective Beam |
| DIFS | Distributed Inter Frame Space |
| SIFS | Short Inter Frame Space |
| EIFS | Extended Inter Frame Space |
| CW | Contention Window |
| RTS | Request to send |
| CTS | Clear to send |
| ACK | Acknowledgment |
| MPDU | MAC Protocol Data Unit |
| DSSS | Direct Sequence Spread Spectrum |

Wireless Communications

WLANs, like most communications systems, employ a layered approach where certain network functions are contained in certain layers. Each layer is responsible for faithfully executing its responsibilities and communicating with other layers through standard defined interfaces. The layering approach hides the implementation of the functionality from other layers. This effectively separates functionality from implementation, allowing manufacturers to develop innovative implementations that achieve standards-required functionality and that easily integrated with other layers. By using standard interfaces, designers can build layer functionality that is independent of functionality at other layers, improving interoperability and development.

Figure 1B:
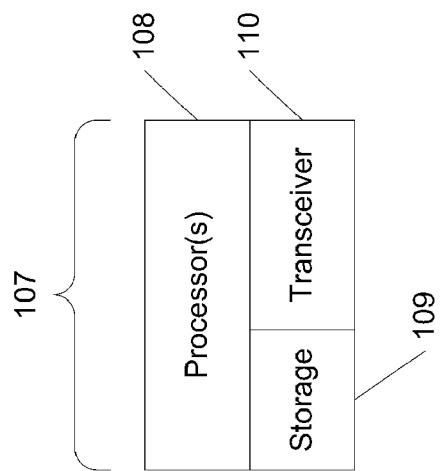
FIGS. 1A and 1B show a block diagrams that may support aspects of the present invention.
Figure 1A:
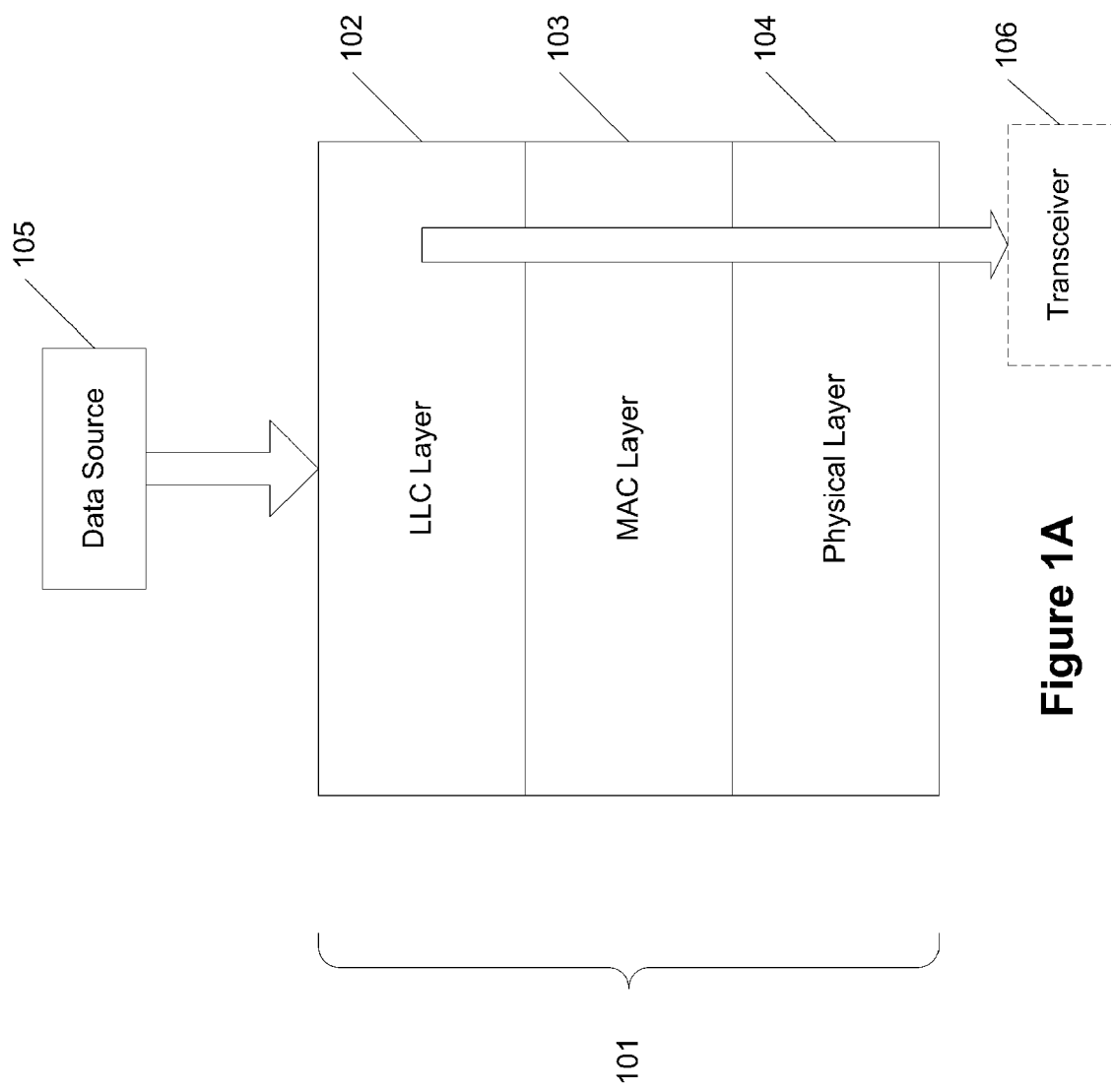

FIG. 1A shows an example of three layers in an access point AP 101. Logical Link Control (LLC) layer 102 delivers data information from data source 105 to Medium Access Control (MAC) layer 103. MAC layer 103 modifies and forwards the data information to physical (PHY) layer 104, where physical layer 104 then forwards the data information to a transceiver 106. To more readily appreciate the invention, aspects of the IEEE 802.11 standard are described in detail. It is appreciated that the layers of access point 101 may also be found in a mobile terminal.

FIG. 1B the shows a hardware description of an access point or mobile terminal 107. It may include a processor (or processors) 108, storage 109, and transceiver 110. These elements may work in conjunction to support the various aspects of the present invention.

Adaptive Arrays and Power Reduction

Aspects of the invention describe methods that harmonize physical layer adaptive array techniques with the MAC layer CSMA/CA protocols. This harmonization maximizes benefit to the WLAN system by reducing transmission power for the adaptive arrays and by increasing reliability and throughput.

Figure 5B:
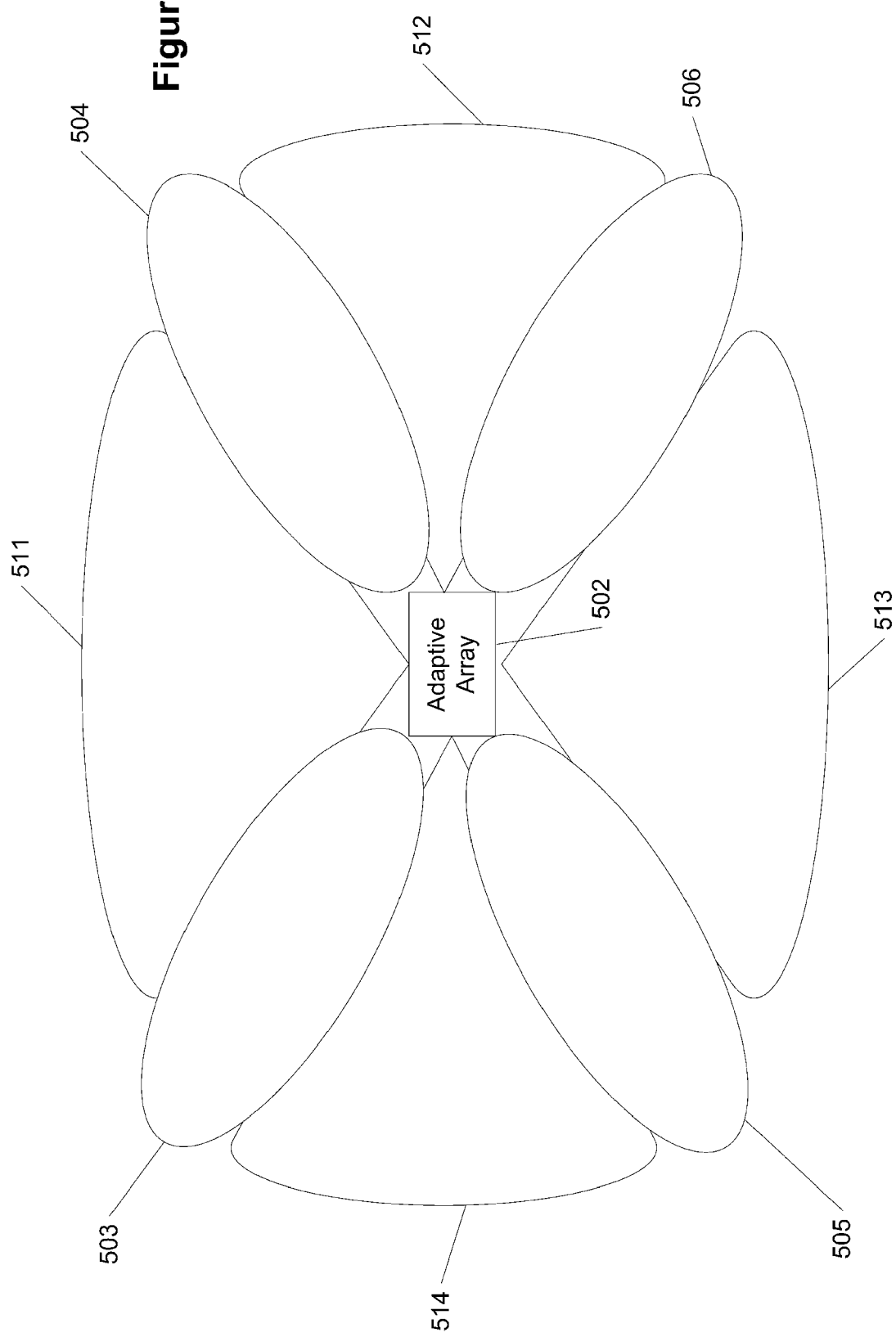

FIGS. 5A and 5B show a WLAN with an access point 501. With respect to FIG. 5A, the access point 501 includes an adaptive array 502 generating beams 503-506. Mobile terminal A 507 is currently covered by beam 505 and can listen for traffic on the channel or channels associated with beam 505. Mobile terminal B 508 is outside the beams from adaptive array 502 at location 508. However, once it moves to location as shown by location 509, it is then within beam 506 and may listen to the channel or channels in beam 506.

Systems based on CSMA/CA require that terminals be capable of accurately determining activity on the medium, i.e., they require a common shared medium. To ensure this condition, WLANs employ a central base station device, called an Access Point (AP) (such as access point 501), which relays all messages from both an external network, if present, as well as from the wireless stations (portable device, or mobile terminal—such as mobile terminals A and B) in the internal WLAN. In short, transmissions always involve the AP—either as the common interface point for all traffic entering or leaving the WLAN, or as an intermediary in the case of wireless-station-to-wireless-station transmissions. Therefore, in order to maintain the CSMA/CA protocol, it is necessary that all terminals be capable of hearing AP transmissions.

AA technology achieves gains by selectively isolating terminals through beam forming—the greater the isolation, the greater the gain. More specifically, the CSMA/CA's need for inclusion is not immediately reconciled with the AA's desire to separate the beams. Aspects of the present invention address these divergent approaches using a new harmonization between physical layer M techniques and MAC layer CSMA/CA protocols that may achieve greater performance in WLANs.

Aspects of the present invention describe an adaptive antenna array method allowing the WLAN AP 501 to effectively isolate wireless station transmissions, while ensuring that all stations hear AP transmissions. This may be achieved by performing two separate beam forming operations that comport with the operation of the CSMA/CA MAC protocol. One beam forming operation adjusts the M to provide a beam with the maximum angular spread to adequately cover all current stations in the network. This beam is referred to as the Basis Beam (BB) 510. It is noted that the basis beam does not have to be symmetrical about the adaptive array 502. Rather, its angular spread may be modified based on physical conditions of the environment and the location of other access points. Further, as shown in FIG. 5B, the angular spread of basis beam may be modified to be complimentary to other existing beams from the adaptive array. Specifically, in this example of FIG. 5B, the basis beam or beams 511-514 is determined and formed to minimize overlap with existing beams 503-506 (the selective beams as described below). Singular basis beam 510 is easier to form than complimentary basis beams 511-514. However, complimentary basis beams 511-514 minimize overlap with the other beams.

The second beam forming operation adjusts the AA to provide a beam or beams with maximum antenna gain and minimum angular spread to cover one or more specific transmitting stations. This beam is referred to as the Selective Beam (SB) (here, beams 503, 504, 505, and 506). The basis beam or beams are employed whenever the AP 501 is idle awaiting possible station transmissions, receiving 802.11 physical layer headers and whenever the AP 501 is transmitting. The SB is employed to isolate the incoming MPDU after physical layer header detection of a station transmission. The BB ensures that the CSMA/CA inclusion requirement is met by using a beam capable of reaching all current stations, allowing them to properly participate in the MAC scheme. The SB ensures that antenna gain is isolated at the desired incoming signal at the right time, which improves SNR and/or reduces transmission power requirements. In this fashion, the AP 501 can effectively adapt its antenna beam or beams to provide the maximum benefit by detecting incoming transmissions and employing the appropriate beam on a packet-by-packet basis. It is appreciated that the basis beam or beams may include one or more beams to cover a larger area with a better SNR. Further, one layer of the SB may be used. Alternatively, two or more of SBs may be used to more finely adjust any one beam to cover a mobile terminal.

Aspects of the invention include the use of adaptive antenna array technologies at the WLAN AP to harmonize antenna gain adaptations with the requirements of the MAC protocol. This process uses the calculation of two types of antenna patterns: a Basis Beam (BB) and a Selective Beam (SB). A single basis beam may be established for the entire WLAN based on the current arrangement of stations, while a single basis beam may be established for each station packet transmission.

FIG. 6 shows illustrative processes for forming basis beams and select beams. In step 601, the process determines a basis beam or beams to be generated from an adaptive array. In step 602, the process forms the basis beam or beams. In step 603, the process determine if a station's transmissions have changed (either started or stopped). If no change, then the process may 1) continue to check to see if the station's transmissions have changed (returning to step 603), 2) continue to form the basis beam or beams (step 602), or 3) again determine the basis beam (step 601). If yes from step 603, then the process determines a select beam or beams to cover the transmitting station or stations in step 604. Next, in step 605, the process forms the select beam or beams. Finally, the process may return to steps 603, 602, or 601 as described above.

The following addresses:
(1) Processes by which the selective beam can be determined,
(2) Processes by which the basis beam can be determined,
(3) Methods by which the basis beam and an selective beam can be employed and coordinated on a packet-by-packet basis, and
(4) Methods that use these techniques to reduce transmission powers and maintain transmission rates in a WLAN.

WLAN systems may be based on the IEEE 802.11 suite of standards and, more specifically, those that employ the Direct Sequence Spread Spectrum (DSSS) technique.

IEEE 802.11

The IEEE 802.11 standard defines and specifies the behaviors of two layers: the Physical (PHY) layer 104 and the MAC layer 103. The former deals with all the base band and radio operations that enable 802.11 stations to produce, detect, and interpret radiated energy; allowing a 'channel' to be formed by which data signals can be exchanged. The latter deals with regulating each terminal's access to this channel. The third layer, the Logical Link Control (LLC) layer 102, is also described in the 802.11 standard. This layer delivers data information to the MAC layer 103 for transmission and receives data from the MAC layer 103 indicating the fate (success/failure) of such transmissions. These three layers are organized on top of each other with the LLC 102 resting on top of the MAC 103, resting on top of the PHY 104.

The IEEE 802.11 standard, when implemented in communications systems, moves information between LLC 102 layers on different machines. To accomplish this goal, the 802.11 standard does not define the behavior of the LLC layer itself, as it does for the MAC and PHY layers, but rather defines a set of interfaces between the LLC and MAC layers. These interfaces ensure that information is exchanged between these two layers in a consistent and standard fashion.

DCF Operation:

The Distributed Coordination Function (DCF) is the 802.11 process that implements the CSMA/CA protocol and governs medium access. This DCF protocol calls for stations to perform carrier sensing to determine if the medium is busy or idle. Stations are not allowed to transmit when the carrier sensing mechanism detects a busy medium.

A station that wishes to transmit a packet must first ensure that its carrier sensing mechanism has reported an idle medium for a period of time referred to as a Distributed Inter-Frame Space (DIFS). If during this DIFS period, the carrier sensing mechanism reports a busy medium the station will enter a random back off mode. At this point, it will generally randomly select a back off timer from a uniform distribution within a group of integers, referred to as the Contention Window (CW), beginning at 0 and ending at a specified maximum value called CWmax. The back off timer represents an integer number of timeslots each 10-microseconds long. In addition to the DIFS interval, the station must further observe an idle medium for the duration of the back off timer before it can begin transmission. After observing an idle medium for a DIFS duration, the station will begin to decrement the back off timer; the back off timer decrements once for each timeslot where its carrier sensing mechanism reports an idle medium. If at any time during this period the station's carrier sensing mechanism reports a busy medium, the countdown will be suspended until an idle medium is detected for a DIFS duration, at which point the countdown will resume. Once the back off timer has reached a value of 0 the station may commence transmission.

From the above discussion it is important to note that the DCF function requires that terminals be capable of hearing the other transmissions on the medium. When they cannot, their carrier sensing algorithms may report idle mediums when in fact the medium will be busy. This results in packet collisions and deteriorates performance.

The receiving station will generate an acknowledgement packet upon correctly decoding the transmitted packet.

FIG. 2 shows an example where data 201 is followed by an acknowledgment 202. Between the end of data 201 and the beginning of acknowledgment 202 is the SIFS period. The time consumed by acknowledgment 202 is represented as time T ack. The delay D experienced by the entity trying to transmit data 201 between data packets may be represented as D=SIFS+Tack.

If a transmitting station does not receive a positive acknowledgement of its transmission, it will re-enter the back off mode. However, in this case, the Contention Window will double and all waiting periods requiring a DIFS value in the original back off mode will now require an Extended Inter-Frame Space (EIFS) value which may be 7 times as long as a DIFS. FIG. 3 shows back off period DIFS followed by the transmission of data 301.

Medium access delays are unbounded because the back off mode can be interrupted indefinitely by competing stations' transmissions. This is a problem in supporting isochronous applications in the DCF mode. Also, the carrier sensing mechanism plays an important role in the MAC protocol—controlling when and if the back off mode is entered, and when the back off timer is stopped and started.

If the transmitting station does receive a positive acknowledgement, it will again enter a back off stage—called post-transmission back off. The transmitting station enters into post-transmission back off regardless of whether or not it has another packet to transmit. By making all stations enter a post-transmission back off stage, the standard ensures that a station always separates consecutive packet transmissions by at least one back off stage.

Figure 4:
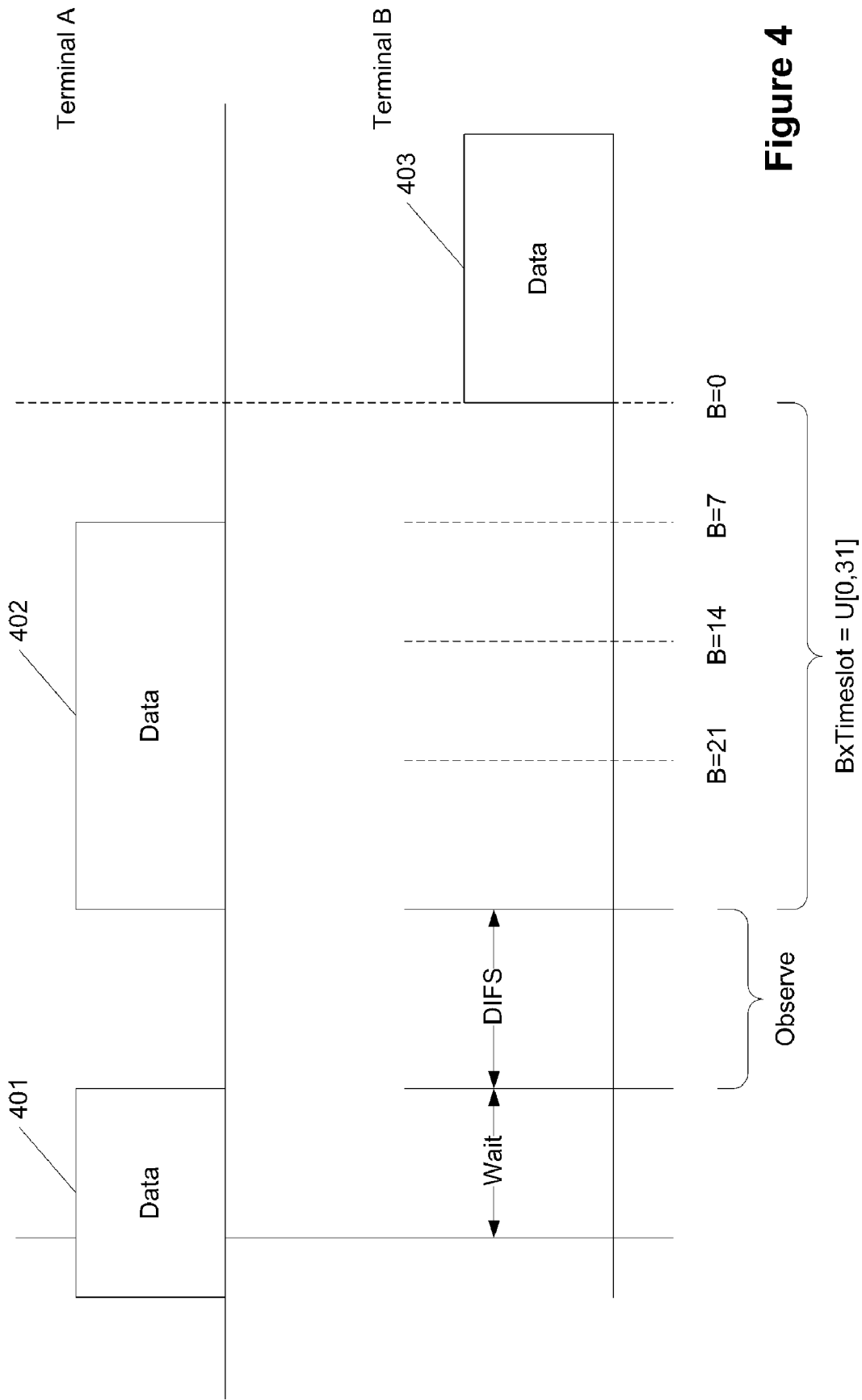

FIG. 4 shows terminal A transmitting data and terminal B waiting to transmit data. Terminal A transmits data 401 followed by a DIFS interval then data 402. Terminal B waits while terminal A transmits data 401. Terminal B then observes the carrier during the DIFS interval. Noting data 402 appearing in the medium, terminal B next enters a back off phase. Here, for instance, the back off interval is 32 cycles. A timer is started at the end of the DIFS period and counts for the number of cycles. At this point, terminal B begins to transmit data 403.

Packet Format

The IEEE 802.11 standard defines a packet format at the physical layer (PHY) that all packets must follow. This includes the use of a physical layer header field that precedes the transmission of a MAC Protocol Data Unit (MPDU—the basic unit of data transmission. The PHY header contains 192 bits sent at 1 Mbps organized in 2 main fields: the Physical Layer Convergence Protocol (PLCP) Preamble of 144 bits and the PLCP Header of 48 bits. The PLCP Preamble is further organized into 6 sub-fields, including the SYNC field of 128 bits, the Start Frame Delimiter (SFD) field of 16 bits, the Signal and Service fields each of 8 bits, and the Length and CRC fields each of 16 bits. Our primary concern will be with the SYNC sub-field, which is a known field invariant across all packet transmissions. That is the 128-bit SYNC sequence never changes and is known a-priori to the AP. The SYNC field provides the AP with a suitable signal with which to estimate the transmitting station's angle of arrival (AOA). This AOA will then be translated into adaptive array weights that will create the SB antenna pattern centered on the calculated AOA.

It is appreciated that other packet handling protocols may be used. The IEEE 802.11 standards are used for illustration only.

Processes for Determining Selective Beam

The following describes how to determine a selective beam to cover a particular transmitting station. This process may be broken up into two distinct parts: determining the Angle of Arrival (AOA) and determining the optimal beam pattern. The optimal beam pattern depends upon implementation factors such as the nature and number of antenna elements in the array. The AOA is the optimum angle at which to center the optimal beam to achieve the best results.

Determination of the Angle of Arrival (AOA):

Adaptive arrays contain multiple antenna elements each spaced a known distance from one another as is known in the art. By measuring the received power and phase of an incoming signal at each element and comparing the differentials, one can compute the Angle of Arrival (AOA) of the received signal. Centering an antenna beam on this AOA assures that the maximal sensitivity is directed in the optimal direction, i.e., the antenna gain is maximized in the direction of the desired signal. Of course, the beam may be modified one direction or another to address, for instance, two mobile stations relatively close to one another and cover both with the same selective beam.

In order to achieve reliable AOA estimation results, it is desirable to have knowledge of the incoming signal. If the AP knows what to expect, it can compare the received signal with a known copy to determine the effects of the channel and compute a more accurate AOA. In practice, it is sometimes difficult to have this kind of a-priori knowledge. In this description, however, techniques are presented that uses the known 128-bit SYNC field contained in all 802.11 packets to provide a comparison basis for the AP. Thus the AP may compare the known values of the SYNC field with those values received in the incoming signal to assist in the AOA determination. This method allows the AP to compute the optimal weights for each incoming packet anew, which improves performance and reduces the detrimental effects of using a stored, aged estimate.

Many algorithms exist to compute the AOA from a received signal. The following provides a method that uses the known SYNC field contained in all 802.11 packets as the basis for this computation. Furthermore, a method may be used by which this calculation is done on all incoming PHY packet headers and thus the resulting calculation is the most immediately relevant and accurate.

The procedure described above is one approach that may be used. This procedure applied by an AP to a station's incoming packet transmission may yield the first half of the necessary information in calculating the SB for that particular station.

Determining An Optimal Beam Pattern

The beam pattern is a function of the characteristics of the antenna array, including type, spacing and number of antenna elements. The optimal beam pattern is the beam pattern that maximizes some desired objective. In this disclosure, there are at least two desired objectives depending upon AP state. When the AP is idle, receiving PHY headers or transmitting, one may desire to have a beam with the minimum angular spread required to provide all associated stations with adequate antenna gain—the Basis Beam (BB). When the AP is receiving MPDU information, however, one may desire to have a beam that provides maximal antenna gain to the particular transmitting station—the Selective Beam (SB). Each is addressed separately below.

Selective Beam

Aspects of the invention create a selective beam that maximizes antenna gain in the direction of the transmitting mobile station. The maximum antenna gain, as noted above, is a function of the antenna array characteristics. An N-element antenna array can provide an antenna gain (in dB) equal to $20*\log 10(N)$ relative to a single isotropic antenna. When computing the SB, one may wish to isolate this maximal antenna gain on the incoming signal as much as possible. This may be achieved by constructing a beam with the minimum angular spread (commonly referred to as the Half Power Bandwidth (HPBW)), however as noted above, the HPBW is limited by the physical characteristics of the antenna array. Therefore, one may compromise and compute a SB pattern that contains the minimum HPBW realizable by the particular antenna array. For example, a 6 element half-dipole linear antenna array may be only able to produce a minimum angular spread of 15°. If this is the case, the narrowest SB beam that can be produced will have a HPBW of 15°. When the SB pattern is calculated, one may update the antenna array weights to center this beam on the computed AOA.

Basis Beam

Aspects of the present invention may include a basis beam or beams that may provide acceptable coverage to all stations, rather than isolating a particular station. The angular spread for this beam or beams can be constructed by aggregating over (taking the union of) all AOAs of the previously calculated SBs. This may yield an angular spread, called the Basis Spread, containing all the associated stations. The BB can then be constructed by selecting antenna array weights that will produce a beam with maximal antenna gain subject to the constraint that the HPBW is equal to the Basis Spread. Constructing a BB in this fashion ensures that antenna sensitivity is efficiently focused on existing stations. Additional, more complicated scenarios exist where the BB contains many peaks and nulls rather than being a smooth beam with a large angular spread. For instance one may wish to compute a complex beam pattern—a many nulled, many peaked pattern—from the SB values and see if a weight arrangement exists to achieve such a pattern.

One implementation to calculate the BB uses the messages sent by the stations during the mandatory association period. By computing AOAs for each station that associates, the AP may have accurate estimates for all associated stations at the time that they associate. The BB should be kept accurate as terminals move, however. Therefore the following describes an approach by which the AP can determine if the current BB is sufficient and can adjust the BB fully cover all associated stations.

Basis Beam Updating

This method involves the calculation of the BB at association for all terminals as described above. Additionally, the AP may occasionally confirm that its BB is appropriately set. During this procedure, the AP may install antenna array weights that provide the maximum angular spread achievable by the antenna array and using this very wide beam or beam and send directed packets, called Survey Packets, addressed to members of the WLAN. Since these packets are individually addressed, they require acknowledgement by the rules of the DCF. This process prompts addressed terminals to make a transmission to the AP (the ACK packet) by which the AP can judge their incoming AOA. The AP may again take the union of all current AOA measurements to determine the best basis beam or beams.

Figure 7:
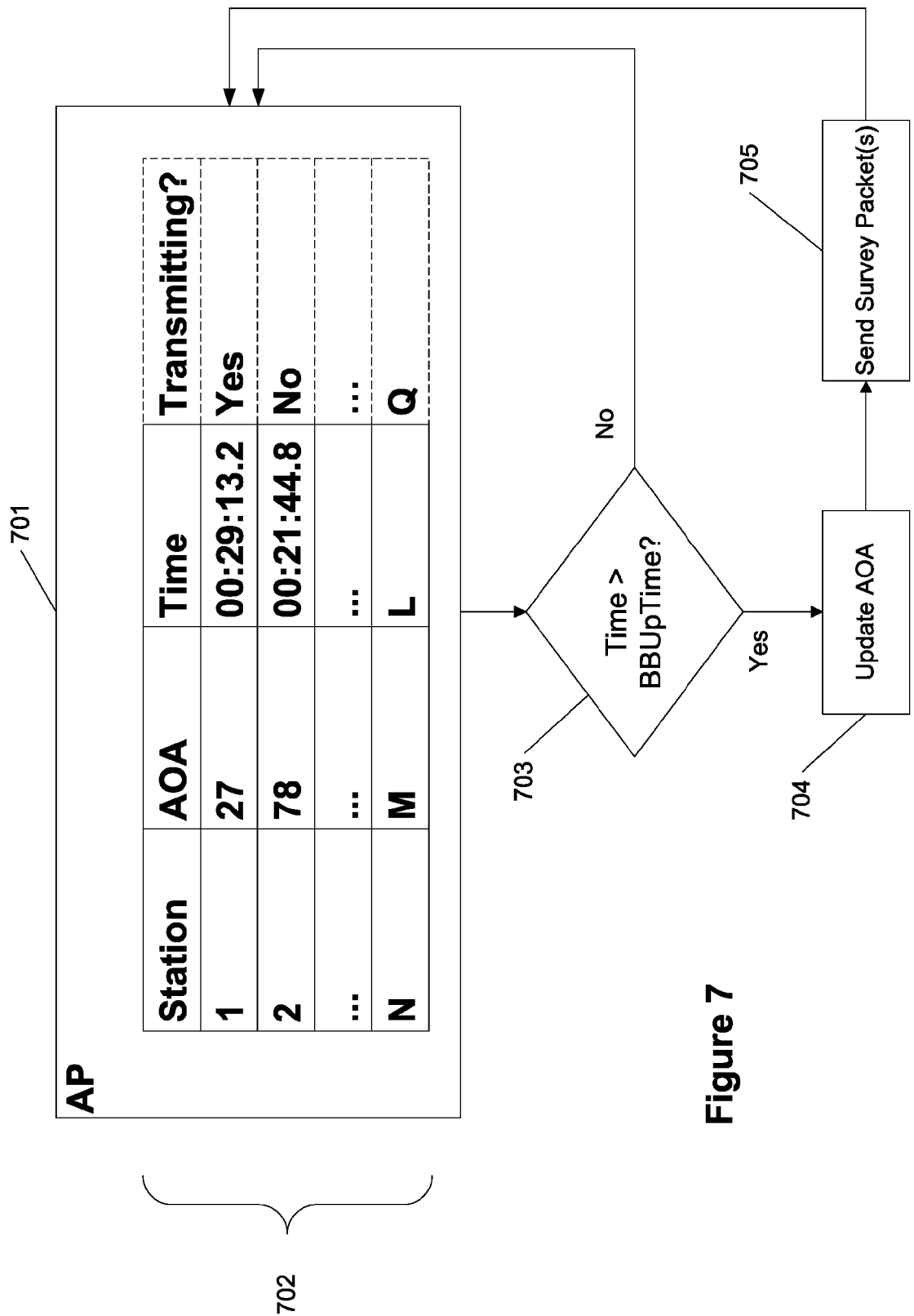
FIG. 7 shows an illustrative process for determining when to update angle of arrival information in accordance with aspects of the present invention.

As shown in FIG. 7, the AP 701 may contain a table 702 associating each station with its latest AOA measurement and the time that measurement was taken. The table may or may not include an indication that the station is transmitting. The AP may continually update the table based on AOA values it calculates from received stations or may update the table based on a periodic window (for instance, every 1-10 minutes). The AP may invoke this BB updating process when its AOA measurements have aged beyond a certain threshold, called the BBUpdateTime (step 703). The stations that are addressed by Survey Packets will be those stations whose last AOA measurement have lapsed beyond the BBUpdateTime. If the time since the last update is greater than the BBUpdateTime, then the AOA is updated in step 704. This may or may not include the sending of survey packets in step 705.

Additionally, the current Basis Spread may influence the BB updating process. If the Basis Spread is sufficiently large, above BBUpdateMaxSpread, then the BB update may not occur. This saves signaling time and energy in situations when the Basis Spread is sufficiently broad and the chances of a hidden associated station are sufficiently small. For instance, if the BB spread is 364 degrees, then the AP may not invoke a BB update procedure to learn if an associated terminal has moved into the 1 degree currently not covered by the Basis Spread. This technique allows the AP to weigh signaling overhead against probability of hidden associated stations to optimize performance.

Basis Beam and Selective Beam Coordination

The BB and SB may be dynamically employed by the AP to best coordinate with the specific MAC-layer operating requirements of the DCF. Therefore, the BB may be used during all AP transmissions—including downlink packet transmission as well as acknowledgements of uplink packet transmissions. Additionally the BB may be used during the PHY header reception of all station transmissions. This allows for equal access opportunities to the medium for all stations. Otherwise, if the SB were employed during the PHY header reception, only the station currently being served by the SB would be capable of initiating a transmission that could be received at the AP. Therefore, with respect to medium access fairness, it is important that the BB be employed until the AP calculates the new antenna array weights for the SB.

The SB may include antenna array weights derived from the received SYNC field. However, the PHY header continues for another 68 microseconds (68 bits transmitted at 1 Mbps) after the SYNC field. During this time the AP may compute the AOA and the appropriate antenna array weights as described previously. The AP may or may not invoke the SB, by installing the recently calculated weights, only after detection of the PHY header completes. This leaves it with ample time to perform the necessary operations and simplifies the power control method described later.

When the AP detects a SYNC field and the appropriate SB has been computed for the transmitting station, then the antenna weights may be adjusted to create the SB. At this point, the MAC layer framework assures the AP that the only energy of interest will be coming from this particular transmitting station. Likewise, the physical layer beam pattern ensures that the only energy detected is that of interest. This type of PHY and MAC layer harmonization safely isolates transmitting stations without fear of disrupting the standard DCF operation.

After switching to the SB and decoding the incoming packet, the AP may update the corresponding table entry with the detected AOA for the station, determine if the BB needs to be altered (true if the AOA falls outside the current Basis Spread and the Basis Spread is below BBUpdateMaxSpread), update the antenna array weights to invoke the appropriate BB and transmit the ACK packet. Since ACKs are transmitted following a SIFS period, the AP has ample time with which to perform the table and BB updating. Alternatively, the SB may only be used after the entire packet has been received and decoded as shown by in FIGS. 8 and 9 below at points A 804, B 809, and C 811.

The following outline summarizes the BB/SB coordination at the AP and assumes that the AP has already calculated an appropriate initial BB. In step 801, the AP changes antenna array weights to achieve desired BB pattern. In step 802, AP awaits transmission from any associated station. Once a transmission occurs, the process advances to step 803. In step 803, the AP detects and decodes the PHY header of station packet transmission.

At this point in the process, the determination of the SB may occur at point A 804. Alternatively, the determination may occur at points B 809 and C 811. The description of the determination of the SB is continued with respect to FIG. 9 below.

Figure 8:
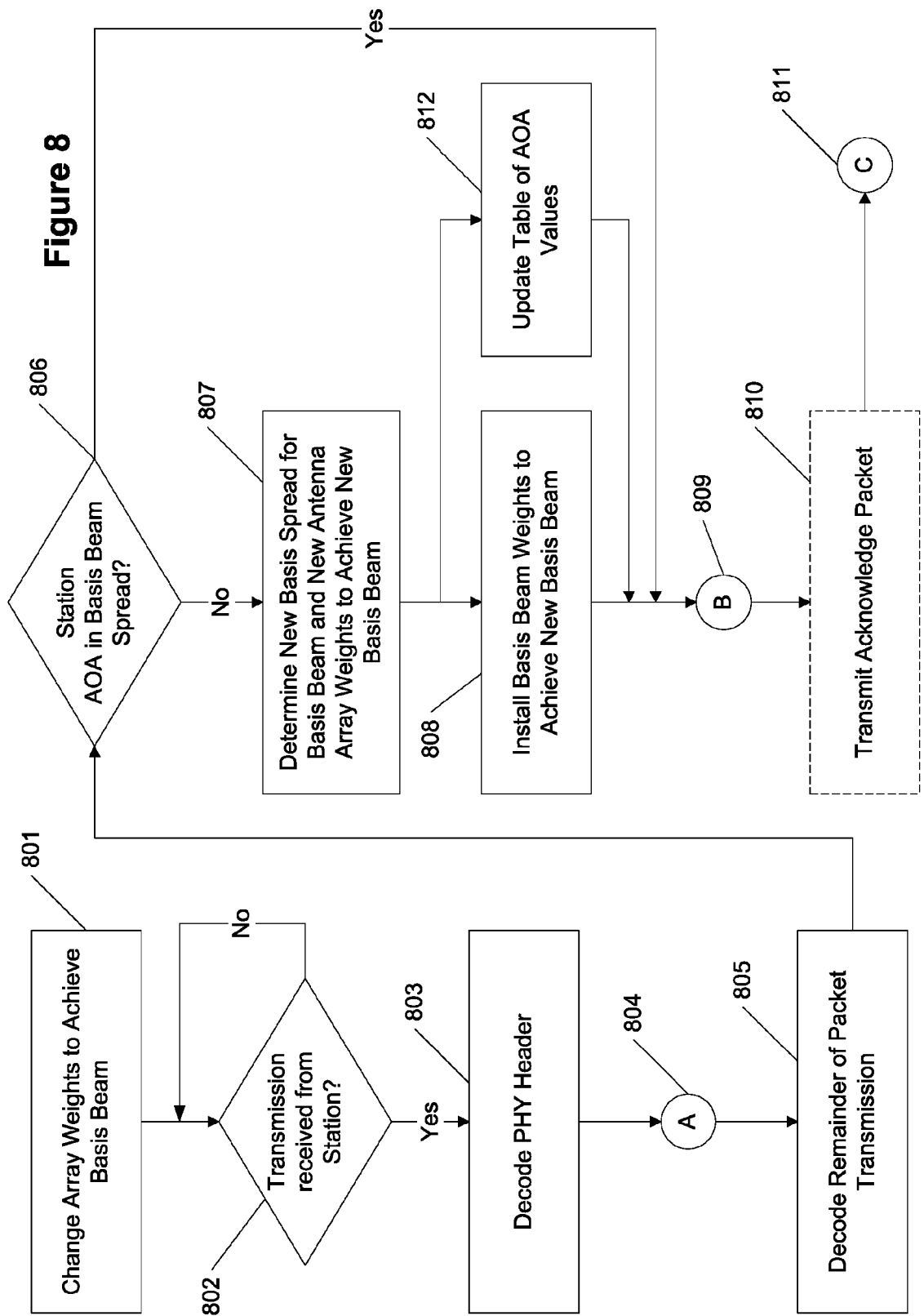
FIG. 8 shows illustrative processes for determining and forming beams in accordance with aspects of the present invention.

As for the remainder of FIG. 8, in step 805, the AP decodes the remainder of the packet transmission (the MPDU portion). In step 806, the AP determines if stations AOA is within the Basis Spread. If yes, then the process steps to after step 808 below. If no, then in step 807, the AP computes new Basis Spread and new antenna array weights to achieve the new BB. In step 808, the AP installs the new BB weights to achieve new basis beam. Before, after, or concurrent with step 808, the AP may also update its table of station AOA values in step 81 2. In step 810, the AP transmits acknowledgement packet and awaits detection of next incoming packet transmission.

Referring to FIG. 9, from any of points A 804, B 809, or C 811, the system detects the AOA for the incoming packet. This may be performed by known techniques or may be performed by the AP comparing the received SYNC field with a known SYNC field to compute station's AOA. In step 902, the AP may continue to decode the incompletely decoded PHY header. Before, during, or after step 902, the process may perform the following steps. In step 903, the process may determine the new spread for a select beam. In step 904, the AP determines new antenna array weights to achieve the new select beam. The new select beam may be centered on the calculate AOA or at least covering in the calculated AOA. In step 905, the AP installs the weights from step 904 to achieve the new select beam with the adaptive array.

Transmission Power Savings

FIG. 10 shows various methods that may be used by which stations operating in WLAN with an AP equipped with an adaptive antenna array can reduce its transmission power while maintaining reliability.

A Signal-to-Noise ratios (SNR) typically determines bit error and packet error rates and is therefore the primary determinant of reliable communications. The higher the SNR, the higher the level of reliability. SNR is composed of two components: the received signal energy and the received non-signal energy, including noise and interference.

Antenna gains contribute to the received signal energy. All things being equal—that is distances and transmission powers remain the same—a 1 dB increase in antenna gain correspondence to a 1 dB increase in SNR value. As described previously the antenna gain associated with a 6 element antenna array relative to an isotropic antenna is on the order of 20*log 10(6)=15.5 dB. This increase translates directly to an increase of 15.5 dB in SNR value.

Conversely one may consider the savings in transmit power that the methods of FIG. 10 may provide by determining what new power level is required to achieve the same level of SNR. With an antenna gain of 15.5 dB, the transmit power may be reduced by a factor 15.5 dB—a roughly 35 times power reduction. The described approaches for harmonizing adaptive antenna arrays may reduce required station transmit power.

To achieve power savings, stations transmit all PHY headers at their original power levels in step 1001 and reduce their MPDU transmissions by a factor equivalent to the achieved antenna gain in step 1004. One implementation of the method is static, that is, terminals are pre-configured to work with APs and the achieved antenna gain is reasonably known a-priori to operation as reflected in step 1002. In this implementation the stations are hardwired to transmit fixed, different power levels for PHY headers and MPDUs when they are associated with an appropriate AP. The station may determine whether or not the AP supports this type of operation through the association process where it learns of the AP's MAC address, ESSID and other valuable configuration information. Typical usage cases may call for the same manufacturer to make both the stations and the AP. In this case, they may employ a consistent MAC addressing scheme such that stations can filter AP MAC addresses to determine if they support this feature. If they do, they may perform the above-mentioned power control, if not they transmit normally.

Another method achieving power savings is to have terminals dynamically adjust their transmit powers based on real-time information such as received signal power as calculated in step 1003, explicit instructions from the AP in step 1005, or a trial-and-error approach where they continually decrease power until an error condition is detected as shown in FIG. 11.

Transmission Rate Preservation

In this section, a method is described by which stations within a WLAN equipped with an AP described can maintain the highest possible transmission rates.

802.11 systems typically employ adaptive transmission rate control. This procedure adjusts the transmission rates of stations among one of four possible values: 11, 5.5, 2 and 1 Mbps. (Other values may be used, modified with alternate standards or number of values.) The rates are usually downgraded when transmission become increasingly unreliable, usually due to poor signal strength or low SNR values. Downgraded transmission rates have performance consequences not only to the particular transmitting station but to the entire WLAN as well. Since the WLAN is a shared medium that employs CSMA/CA, lower rate transmissions cause other stations to defer more than necessary. For instance, when a terminal downgrades from 11 to 5.5 Mbps, other terminals must wait roughly twice as long before accessing the medium. The effects are magnified the greater the rate differential. This added delay contributes to poor performance for isochronous applications, such as voice and video, and reduces throughput. Therefore, one may wish to ensure that all stations within a WLAN can reliably transmit at the highest possible rate.

FIG. 11 shows this process. In FIG. 11, an AP instructs a mobile station to reduce power in step 1101. In step 1102, the AP determines if the SNR is greater than a value required to provide a full rate transmission. If yes, the AP instructs the mobile station to again reduce power in step 1101. If no, then the AP resets the power level to a level that provided the desired SNR in step 1103.

Equipping an AP with the adaptive antenna array techniques described herein may help to preserve transmission rates with the WLAN. This can be seen by the associated increase in SNR offered by the technique. The above disclosure described how that antenna array harmonization may be used to increase the SNR and lower transmission powers. In short, these techniques provide a region of benefit within the power saved-, SNR increased-plane. By adopting a benefit payout strategy that provides adequate SNR, one can use this antenna array harmonization technique to ensure full rate transmission. Thus, this method by which this technique can be used by each station so that WLAN performance does not suffer from multi-rate degradation. This method calls for each station to adopt power-savings only up to the point where the SNR remains above the value required to provide reliable full-rate transmission. By employing such a method, one is assured that the antenna array harmonization technique can provide the right mix of power savings and performance enhancement.

A number of other applications of aspects of the invention are possible and the above list is illustrative and by no means exhaustive. The present invention has been described in terms of preferred and exemplary embodiments thereof. Numerous other embodiments, modifications and variations within the scope and spirit of the appended claims will occur to persons of ordinary skill in the art from a review of this disclosure.

What is claimed is:

1. A method for adjusting beams in a wireless communication system comprising the steps of:
   forming a basis beam;
   listening for a transmission by a mobile station, wherein said transmission includes a packet including a header; and
   forming a select beam to cover said mobile station, said select beam formed responsive to said header,
   wherein an angle of arrival of said mobile station is determined from header information contained in said header, and wherein said forming step determines if said mobile station is covered by comparing said angle of arrival of said mobile station with angles covered by said basis beam.

2. The method according to claim 1, further comprising the step of:
   terminating said select beam when said mobile station is no longer transmitting.

3. The method according to claim 1, further comprising the steps of:
   determining antenna weights for said basis beam; and
   determining antenna weights for said select beam.

4. A method comprising the steps of:
   determining when an entry for a station had been last updated in a table in a wireless access point, said wireless access point configured to form a basis beam to cover said station at least when said station is idle and configured to form a select beam to cover said station when said station is active:
   determining if a time for said last update for said station is greater than a threshold;
   listening for a transmission by said station;

updating said entry for said station responsive to every transmission by said station; and updating said basis beam based on said updated entry for said station.

5. The method according to claim 4, said updating step further comprising the step of:

sending survey packets to said station.

6. The method according to claim 4, wherein said table includes angle of arrival information.

7. The method according to claim 4, wherein said table includes angle of arrival information computed from synchronization information received in a signal from said station.

8. A method for adjusting beams comprising the steps of:

determining if a station is covered by a basis beam;

adjusting said basis beam to cover said station responsive to determining said station is not covered by said basis beam, wherein an angle of arrival of said station is determined from header information contained in a packet received from said station and wherein said determining step determines if said station is covered by comparing said angle of arrival of said station with angles covered by said basis beam.

9. A method for adjusting beams comprising the steps of:

decoding at an access point a first part of a transmitted packet to determine the angle of arrival of said transmitted packet as transmitted from a mobile station;

adjusting a basis beam to ensure coverage of said mobile station based on said angle of arrival;

decoding a second part of the transmitted packet as received via a select beam; and adjusting the select beam based on information in the second part of the transmitted packet, wherein said decoding steps and said adjusting steps are responsive to each transmitted packet received from said mobile station at said access point.

10. A system for adjusting beams in a wireless communication system comprising:

means for forming a basis beam;

means for listening for a transmission by a mobile station, said transmission including at least one packet including at least one header; and means for forming a select beam to cover said mobile station based on at least one header, wherein an angle of arrival of said mobile station is determined from header information contained in said at least one header, and wherein said means for forming a basis beam includes determining if said mobile station is covered by comparing said angle of arrival of said mobile station with angles covered by said basis beam.

11. The system according to claim 10, further comprising:

means for terminating said select beam when said mobile station is no longer transmitting.

12. The system according to claim 10, further comprising:

means for determining antenna weights for said basis beam; and means for determining antenna weights for said select beam.

13. A system comprising:

means for determining when an entry for a station had been last updated in a table in a wireless access point, said wireless access point configured to form a basis beam to cover said station at least when said station is idle and configured to form a select beam to cover said station when said station is active;

means for determining if a time for said last update for said station is greater than a threshold;

means for receiving a transmission by said station;

means for updating said entry for said station responsive to receiving every transmission by said station; and means for updating said basis beam based on said updated entry for said station.

14. The system according to claim 13, said means for updating further comprising:

means for sending survey packets to said station.

15. The system according to claim 13, wherein said table includes angle of arrival information.

16. The system according to claim 13, wherein said table includes angle of arrival information computed from synchronization information received in a signal from said station.

17. A system for adjusting beams comprising:

means for determining if a station is covered by a basis beam; and means for adjusting said basis beam to cover said station, wherein an angle of arrival of said station is determined from header information contained in a packet received from said station and wherein said means for determining determines if said station is covered by comparing said angle of arrival of said station with angles covered by said basis beam.

18. A system for adjusting beams comprising:

a first means for decoding at an access point a first part of a transmitted packet to determine the angle of arrival of said transmitted packet as transmitted from a mobile station;

a first means for adjusting a basis beam to ensure coverage of said mobile station based on said angle of arrival;

a second means for decoding a second part of the transmitted packet as received via a select beam; and a second means for adjusting the select beam based on information in the second part of the transmitted packet, wherein said first decoding means, said second decoding means, said first adjusting means, and said adjusting means are responsive to each transmitted packet received from said mobile station at said access point.

19. An access point comprising:

an antenna array configured to output a select beam to cover an active mobile station and a basis beam to cover at least an idle mobile station:

one or more processors that receive packets from said antenna, said packets generated by mobile stations, said one or more processors configured to decode a first portion of said packets, determine an angle of arrival of said packets based on information regarding said packets from said antenna array; and output antenna array weights to said antenna array to steer said select, beam to cover an active mobile station of said mobile stations.

20. The access point according to claim 19, wherein said processor is further configured to output antenna array weights to adjust said basis beam generated by said antenna array based on information from said packets.

* * * * *

UNITED STATES PATENT AND TRADEMARK OFFICE
CERTIFICATE OF CORRECTION

PATENT NO.        : 7,720,509 B2                                           Page 1 of 1
APPLICATION NO.   : 10/711441
DATED             : May 18, 2010
INVENTOR(S)       : Famolari It is certified that error appears in the above-identified patent and that said Letters Patent is hereby corrected as shown below:

In the Specification,

In Column 3, Line 22, delete "the shows a" and insert -- shows a --, therefor.

In Column 3, Line 65, delete "M techniques" and insert -- AA techniques --, therefor.

In Column 4, Line 7, delete "M to" and insert -- AA to --, therefor.

In Column 10, Line 39, delete "81 2." and insert -- 812. --, therefor.

In the Claims,

In Column 12, Line 64, in Claim 4, delete "active:" and insert -- active; --, therefor.

In Column 14, Line 48, in Claim 19, delete "station:" and insert -- station; --, therefor.

In Column 14, Line 57, in Claim 19, delete "select, beam to" and insert -- select beam to --, therefor.

Signed and Sealed this
Twentieth Day of January, 2015

Michelle K. Lee
*Deputy Director of the United States Patent and Trademark Office*